Feb. 23, 1965

E. L. McFERREN 3,170,348

AUXILIARY HIGH-SPEED TABLE FOR VERTICAL
TURRET LATHES AND THE LIKE

Filed June 4, 1962

INVENTOR.
EDGAR L. McFERREN
BY
Wolfe, Hubbard, Voit & Osann
ATTYS.

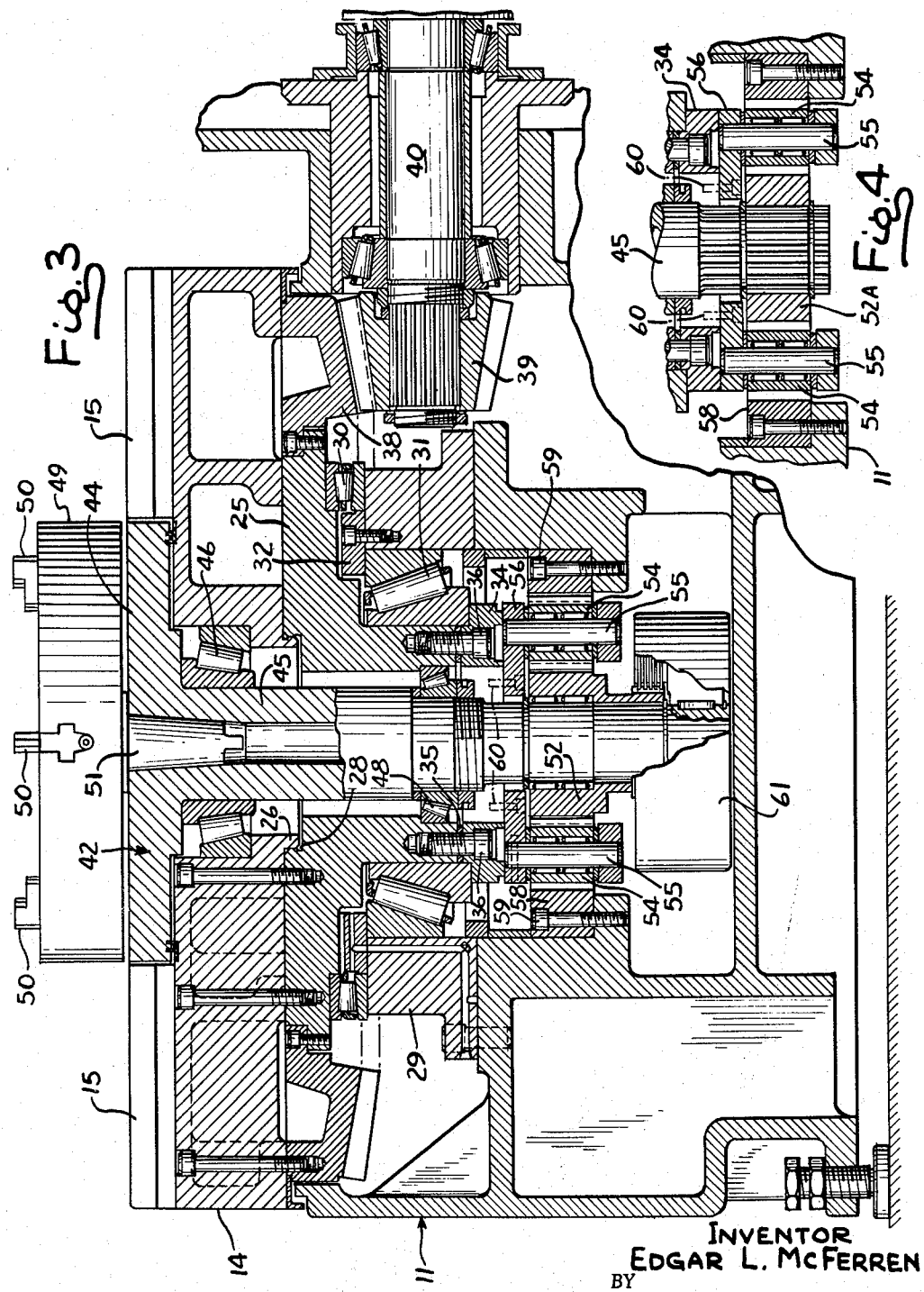

United States Patent Office 3,170,348
Patented Feb. 23, 1965

---

3,170,348
AUXILIARY HIGH-SPEED TABLE FOR VERTICAL TURRET LATHES AND THE LIKE
Edgar L. McFerren, Fond du Lac, Wis., assignor to Giddings & Lewis Machine Tool Company, Fond du Lac, Wis., a corporation of Wisconsin
Filed June 4, 1962, Ser. No. 199,872
5 Claims. (Cl. 82—28)

The present invention relates to machine tools in general and, more specifically, to an auxiliary high-speed table arrangement that finds particular utility in such machines as vertical turrent lathes and vertical boring mills. Such machines have relatively large diameter horizontal tables which are rotatably driven at comparatively low speeds, thereby placing limitations on the nature of the work that the machines can handle.

One object of the present invention is to provide a machine tool such as a vertical turrent lathe or vertical boring mill having an auxiliary high-speed table which will increase substantially the range of work that can be handled efficiently on the machine.

Another object is to provide a vertical turrent lathe or vertical boring mill with an auxiliary high-speed table of the character set forth above which will adapt the machine to operate efficiently upon a variety of ferrous or non-ferrous "space age" materials.

A further object is to provide a machine of the foregoing type having an auxiliary high-speed table capable of accomplishing the above results without increasing the speed of the main table.

Other objects and advantages will become apparent as the following description proceeds, taken together with the accompanying drawings, wherein:

FIG. 3 is an enlarged vertical sectional view taken in a plane running along the diameter of the main and auxiliary tables and the axis of the table drive pinion.

FIG. 4 is an enlarged fragmentary vertical sectional view through an auxiliary table drive similar to that illustrated in FIG. 3 but showing a slight modification thereof.

Figure 1:
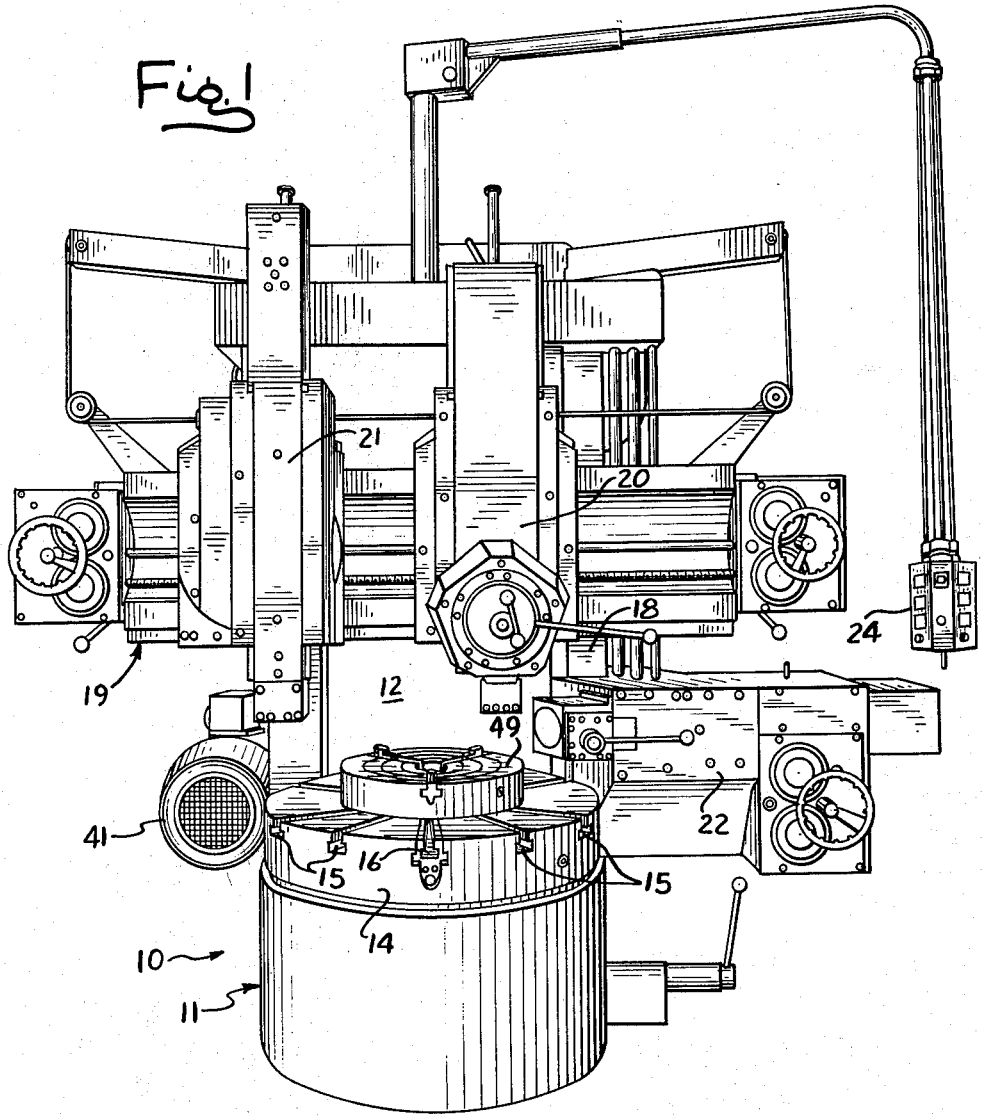
FIGURE 1 is a front perspective view of an illustrative vertical turret lathe embodying the present invention.
Figure 2:
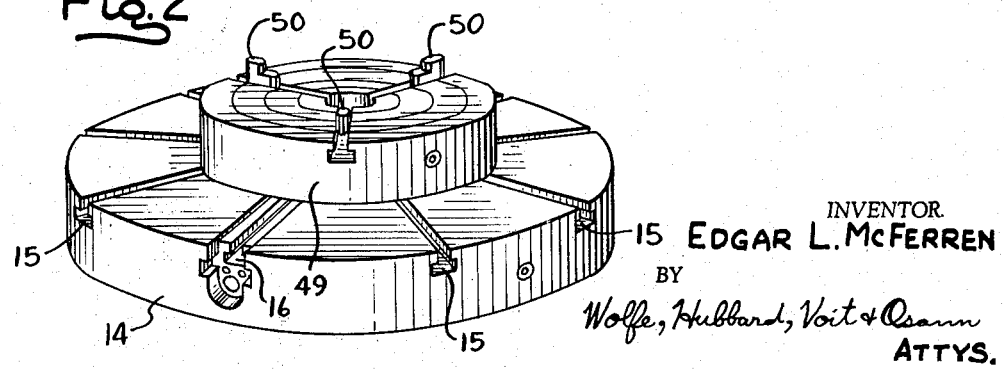
FIG. 2 is an enlarged fragmentary perspective view of the main table of the machine of FIG. 1, together with a chuck adapted to be driven by the auxiliary high-speed table.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, it will be noted that the invention is there exemplified in an illustrative machine tool which happens to be a vertical turret lathe 10. In this instance, the machine 10 comprises a bed 11 with a relatively large integral column 12 rising at one end thereof. Situated on the bed 11 in front of the base of the column 12 is a main table 14 journaled for rotation about a vertical axis. The top surface of the table 14 is provided with a plurality of radially disposed T-slots 15, 16 which permit the mounting of work-engaging clamping devices and jaws in a well-known manner.

The column 12 is formed with vertically disposed ways 18 on which a crossrail 19 is mounted for vertical sliding movement therealong. The crossrail 19 may be adjustably positioned along the ways 18 in a well-known manner. Mounted on appropriate saddles adapted to traverse the crossrail 19 are a rail turret head 20 and a rail ram head 21. Both of the heads 20, 21 are adapted to hold a variety of tools for operating on workpieces fixed to the main table 14. The machine 10 also includes a side turret head 22 mounted on one side of the column 12 adjacent the table 14 and also adapted to hold a plurality of different tools for machining workpieces carried by the table. A control pendant 24, which can be positioned by the operator at any convenient point in view of the work, affords a convenient means for controlling the movable units of the machine.

The main table 14 is of flat, generally cylindrical form, and provided with considerable internal stiffening. The table 14 is rigidly fixed to a table carrier or subtable 25, being centered thereon as by means of a depending hub 26 and interfitting annular recess 28 in the carrier 25. The table carrier 25 is formed as a massive flanged sleeve and is journaled upon and within a heavy annular post or foundation ring 29 fixed within the interior of the bed 11. In this instance, the table carrier 25 and post 29 have interposed therebetween an intifriction thrust bearing 30 and an antifriction radial bearing 31, in this case both of the precision tapered roller type. For accuracy and rigidity, the radial bearing 31 may be preloaded to a predetermined extent as by means of upper and lower retaining collars 32, 34. In this instance, the amount of preloading is controlled by the collar 34 which is axially adjustable by means of shim 35 and cap screws 36.

Fixed to the underside of the main table 14 in surrounding relation with the table carrier 25 is a relatively large ring gear 38 by means of which the table is driven. Drivingly meshing with the ring gear 38 is table drive pinion 39. The latter is fixed as by means of a spline connection to the end of drive shaft 40 at the output end of a change speed transmission (not shown) located in the rearward portion of bed 11. The transmission may be powered as by means of main drive motor 41 on the left side of the machine as shown in FIG. 1. By means of appropriate controls on the machine 10, the table 14 may be driven at a variety of speeds within its predetermined range of operation, the normal upper limit of these speeds being governed by such factors as the permissible limit of pitch line velocity for acceptable gear life in the ring gear 38 and pinion 39, and limitations dictated by the use of material such as cast iron in the structure of the table.

Provision is made in the machine 10 for increasing substantially the range of work that can be efficiently handled thereon, both as to machining speed and composition of material, without increasing the normal speed range of the main table 14. This is accomplished by means of an auxiliary high-speed table 42 nested within the main table 14 and driven by the latter but at a substantially higher speed.

Upon more particular reference to FIG. 3, it will be noted that the table 42 comprises a circular portion 44 lying flush with the top of the main table 15 and a hollow depending spindle 45 integrally connected to the portion 44. The auxiliary high-speed table 42 is journaled within the main table 14 and the table carrier 25 as by means of a pair of opposed tapered roller bearings 46, 48. For holding workpieces to be machined on the high-speed table 42, the latter may be equipped with a conventional chuck 49 having a plurality of jaws 50. The chuck 49 may conveniently be drivingly connected to the table 42 as by means of a depending tapered shank 51 which engages a corresponding tapered bore in the spindle 45.

Means are provided for driving the auxiliary table 42 from the main table 14 at a stepped up speed which may, for example, be on the order of a 1 to 3 ratio. In the present instance, this is accomplished by the use of a planetary gear connection between the main table 14 and the auxiliary table 42. The planetary connection in this case comprises a sun gear 52 carried on the depending spindle 45, a plurality of planet gears 54 journaled on spindles 55 fixed to a planet carrier 56, and a ring gear 58 fixed within the bed 11 as by means of retainer screws 59. Power is applied to the planetary gear connection via the planet carrier 56 which is fixed to the bearing retaining collar 34 as by means of cap screws 60. The collar 34, in turn, is fixed to the table carrier 35 by means of cap screws 36.

The planetary connection may be selectively actuated to transmit power so as to drive the auxiliary table 42 at a stepped up speed relative to the main table 14 or to permit rotation of the tables in unison. For this purpose, the sun gear 52 may be journaled on the lower end portion of the spindle 45 and selectively coupled thereto as by means of a multiple disk friction clutch 61. The latter in this case happens to be electromagnetically actuated. Thus, when the clutch 61 is energized, the sun gear 52 becomes drivingly connected to the spindle 45. In that event, upon rotation of the main table 14, power is applied from the latter through the table carrier 25, planet carrier 56 and planet gears 54 to drive the sun gear 52, spindle 45 and table 42 at a stepped up speed dependent upon the proportions of the planetary gear elements 52, 54, 58. On the other hand, when the clutch 61 is de-energized, the sun gear 52 merely idles on the spindle 45 as the main table is rotated and no driving torque is applied to the auxiliary table 42. The latter under these conditions will either remain idle or, if connected to the main table 14 by an overlapping workpiece, will simply rotate as an integral part of the main table.

Turning now to FIG. 4, a slightly modified planetary connection is there shown and is also embraced within the scope of the present invention. In this instance, the clutch 61 is eliminated and the sun gear 52A is fixed to the lower end portion of the spindle 45 as by means of a splined connection. The planetary members are in other respects identical or closely similar to those shown in FIG. 3. The auxiliary table 42 in this case will be driven at stepped up speed whenever the main table 14 is rotated. When a workpiece overlaps the tables 14 and 42 a running clearance is maintained between one of the tables and the workpieces due to the speed differential.

I claim as my invention:

1. In a machine tool such as a vertical turret lathe or the like, the combination comprising a bed, a main table journaled on said bed, a drive shaft, a drive pinion connected to said drive shaft, and a ring gear on said main table drivingly engaged with said pinion, an auxiliary high-speed table journaled within said main table, a planetary drive connection between said main table and said auxiliary table, said drive being actuatable to operate said auxiliary table at a stepped up speed relative to said main table or to permit rotation of said tables in unison, and means for selectively actuating said drive connection whereby said auxiliary table is driven at a greater speed than said main table or remains rotatable in unison therewith.

2. In a machine tool such as a vertical turret lathe or vertical boring mill, the combination comprising a bed, a main table journaled on said bed, a drive shaft, a drive pinion connected to said drive shaft, and a ring gear on said main table drivingly engaged with said pinion, an auxiliary high-speed table journaled within said main table, a planetary drive connection between said main table and said auxiliary table adapted to drive the latter at a speed substantially greater than that of said main table, and means for selectively connecting and disconnecting said planetary drive connection between said auxiliary table and said main table.

3. In a machine tool such as a vertical turret lathe or vertical boring mill, the combination comprising a bed, a main table of flat annular form journaled on said bed, a drive shaft, a drive pinion connected to said drive shaft, and a ring gear on said main table drivingly engaged with said pinion, an auxiliary high-speed table journaled within said main table, a chuck fixed to said auxiliary table, a planetary drive connection between said main table and said auxiliary table constructed and arranged to rotate the latter at substantially greater speed than said main table, and means for selectively connecting and disconnecting said planetary drive connection between said auxiliary table and said main table.

4. In a machine tool such as a vertical turret lathe or vertical boring mill, the combination comprising a bed, a main table of flat annular form journaled on said bed, a drive shaft, a drive pinion connected to said drive shaft, and a ring gear on said main table drivingly engaged with said pinion, an auxiliary high-speed table journaled within said main table, a spindle fixed to said auxiliary table, a sun gear mounted on said spindle, a ring gear fixed to said bed in surrounding relation with said sun gear and said spindle, a planet carrier fixed to said main table, and a plurality of planet gears journaled on said carrier and disposed in meshed engagement with said gun gear and said ring gear.

5. In a machine tool such as a vertical turret lathe or vertical boring mill, the combination comprising a bed, a main table of flat annular form journaled on said bed, a drive shaft, a drive pinion connected to said drive shaft, and a ring gear on said main table drivingly engaged with said pinion, an auxiliary high-speed table journaled within said main table, a spindle fixed to said auxiliary table, a sun gear journaled on said spindle, a ring gear fixed to said bed in surrounding relation with said sun gear and said spindle, a planet carrier fixed to said table, a plurality of planet gears journaled on said carrier and disposed in meshed engagement with said sun gear and said ring gear, and a clutch interposed between said sun gear and said spindle, said clutch being adapted to couple and uncouple the drive between said main and said auxiliary tables.

References Cited in the file of this patent

UNITED STATES PATENTS

| | | |
|---|---|---|
| 738,471 | Nardin | Sept. 8, 1903 |
| 873,787 | Riddell | Dec. 17, 1907 |
| 891,199 | Wheeler | June 16, 1908 |
| 2,845,312 | Hollis | July 29, 1958 |